(12) United States Patent
Lee et al.

(10) Patent No.: US 9,100,971 B2
(45) Date of Patent: Aug. 4, 2015

(54) METHOD AND APPARATUS FOR TRANSMITTING AND RECEIVING SIGNALS IN MULTI-CELLULAR NETWORK

(71) Applicants: Samsung Electronics Co. Ltd., Suwon-si, Gyeonggi-do (KR); KOREA UNIVERSITY RESEARCH AND BUSINESS FOUNDATION, Seoul (KR)

(72) Inventors: Hyun-Ho Lee, Seoul (KR); Young-Chai Ko, Seoul (KR)

(73) Assignees: Samsung Electronics Co., Ltd., Suwon-si (KR); Korea University Research And Business Foundation, Seoul (KR)

( * ) Notice: Subject to any disclaimer, the term of this patent is extended or adjusted under 35 U.S.C. 154(b) by 159 days.

(21) Appl. No.: 13/853,669

(22) Filed: Mar. 29, 2013

(65) Prior Publication Data
US 2013/0258971 A1 Oct. 3, 2013

(30) Foreign Application Priority Data
Mar. 29, 2012 (KR) ........................ 10-2012-0032688

(51) Int. Cl.
*H04W 72/08* (2009.01)
*H04B 7/06* (2006.01)
*H04B 7/08* (2006.01)

(52) U.S. Cl.
CPC ........... *H04W 72/082* (2013.01); *H04B 7/0617* (2013.01); *H04B 7/0634* (2013.01); *H04B 7/086* (2013.01)

(58) Field of Classification Search
CPC ... H04W 72/082; H04B 7/086; H04B 7/0634; H04B 7/0617
USPC ......................... 370/328, 329, 331, 236, 252; 455/452.2, 501
See application file for complete search history.

(56) References Cited

U.S. PATENT DOCUMENTS

| 8,718,665 B2 * | 5/2014 | Kim et al. .................. 455/452.2 |
| 2010/0248712 A1 | 9/2010 | Lee et al. |

(Continued)

FOREIGN PATENT DOCUMENTS

| KR | 10-2010-0107099 A | 10/2010 |
| KR | 10-2011-0033079 A | 3/2011 |

(Continued)

*Primary Examiner* — Brian D Nguyen
(74) *Attorney, Agent, or Firm* — Jefferson IP Law, LLP (57) ABSTRACT

A method and an apparatus for transmitting and receiving a signal using interference alignment in a multi-cellular network are provided. The method includes determining a total number $S_j$ of effective Inter-Cell Interference (ICI) channels of a j-th cell, determining a number $t_{j,i}$ of effective ICI channels caused by each of other Base Stations (BSs) and a number $n_{j,i}^{(s)}$ of ICI channels aligned to each effective ICI channel, acquiring information about a channel matrix between users of the j-th cell and each BS, determining effective ICI channels reaching from the other BSs to users of the j-th cell and a receive beamforming matrix by reference to $t_{j,i}$, $n_{j,i}^{(s)}$ and information about the channel matrix, transmitting feedback information indicating the channel matrix and the receive beamforming matrix to the BS of the j-th cell, and receiving a signal from the BS of the j-th cell using the determined receive beamforming matrix.

19 Claims, 5 Drawing Sheets

(56) References Cited

U.S. PATENT DOCUMENTS

| | | | |
|---|---|---|---|
| 2011/0177834 A1* | 7/2011 | Shin et al. | 455/501 |
| 2012/0040706 A1 | 2/2012 | Shin et al. | |
| 2012/0106603 A1* | 5/2012 | Kim et al. | 375/219 |
| 2012/0140845 A1* | 6/2012 | Kwak et al. | 375/295 |
| 2012/0163488 A1* | 6/2012 | Kim | 375/267 |
| 2012/0275376 A1* | 11/2012 | Sampath et al. | 370/328 |
| 2013/0078991 A1* | 3/2013 | Nam | 455/423 |

FOREIGN PATENT DOCUMENTS

| | | |
|---|---|---|
| KR | 10-2011-0049141 A | 5/2011 |
| KR | 10-2011-0084818 A | 7/2011 |
| KR | 10-2012-0014792 A | 2/2012 |

* cited by examiner

METHOD AND APPARATUS FOR TRANSMITTING AND RECEIVING SIGNALS IN MULTI-CELLULAR NETWORK

PRIORITY

This application claims the benefit under 35 U.S.C. §119(a) of a Korean patent application filed on Mar. 29, 2012 in the Korean Intellectual Property Office and assigned Serial No. 10-2012-0032688, the entire disclosure of which is hereby incorporated by reference.

JOINT RESEARCH AGREEMENT

The presently claimed invention was made by or on behalf of the below listed parties to a joint research agreement. The joint research agreement was in effect on or before the date the claimed invention was made and the claimed invention was made as a result of activities undertaken within the scope of the joint research agreement. The parties to the joint research agreement are 1) SAMSUNG ELECTRONICS CO., LTD., and the 2) KOREA UNIVERSITY RESEARCH AND BUSINESS FOUNDATION.

BACKGROUND OF THE INVENTION

1. Field of the Invention

The present invention relates generally to transmission and reception of signals in a multi-cellular network. More particularly, the present invention relates to a method and apparatus for allowing cells to simultaneously transmit and receive signals with minimized influence of interference signals in a network where a plurality of cells exist.

2. Description of the Related Art

In a multi-cellular network, in order to maximize the efficiency of wireless resources, Base Stations (BSs) simultaneously transmit signals to a plurality of users (i.e., user terminals) using the same wireless resources (time, frequency, or code), which may cause a reduction of the performance of the entire network due not only to Inter-User Interference (IUI) in a cell, but also to Inter-Cell Interference (ICI).

Various studies have been made to increase the throughput of the system in the multi-cellular network. Technology for improving the performance by sharing channel or data information between BSs is referred to as 'BS cooperative communication'. However, this communication technology based on the cooperation between BSs has a shortcoming in that an excessive amount of backhaul infrastructure needs to be built.

Recently, an interference alignment technique has emerged, that secures subspaces which are not affected by interference signals, by aligning interference signals incoming from other cells to some subspaces (or in some directions) among attainable signal spaces. Signal spaces in the interference alignment technology may be secured by expanding the time, the frequency or the number of antennas. Technology for applying the interference alignment technique in the multi-cellular network by expanding the number of antennas has been studied.

However, the related-art technology merely limits the number of cells in the network to two, and the number of users in a cell to two, but has not presented a specific way for the interference alignment technique that can be applied to a situation where the number of cells and the number of users in a cell are not limited.

The above information is presented as background information only to assist with an understanding of the present disclosure. No determination has been made, and no assertion is made, as to whether any of the above might be applicable as prior art with regard to the present invention.

SUMMARY OF THE INVENTION

Aspects of the present invention are to address at least the above-mentioned problems and/or disadvantages and to provide at least the advantages described below. Accordingly, an aspect of the present invention is to provide a method and apparatus for transmitting and receiving signals in a multi-cellular network.

Another aspect of the present invention is to provide a method and apparatus for transmitting and receiving signals, which can be applied to a situation where the number of cells in a multi-cellular network and the number of users in a cell are not limited.

Yet another aspect of the present invention is to provide a method and apparatus for transmitting and receiving downlink signals, to which an interference alignment technique in a multi-cellular network is applied.

In accordance with an aspect of the present invention, a method for receiving a signal in a multi-cellular network is provided. The method includes determining a total number $S_j$ of effective Inter-Cell Interference (ICI) channels of a j-th cell to which a user belongs, from a number B of cells belonging to the multi-cellular network and a number $K_j$ of users in the j-th cell; determining a number $t_{j,i}$ of effective ICI channels caused by each of other Base Stations (BSs) and a number $n_{j,i}^{(s)}$ of ICI channels aligned to each effective ICI channel, based on the number B of cells and the total number $S_j$ of effective ICI channels; acquiring information about a channel matrix between users of the j-th cell and each BS, which is estimated based on reference signals transmitted from a BS of the j-th cell and other BSs; determining effective ICI channels reaching from the other BSs to users of the j-th cell and a receive beamforming matrix by reference to $t_{j,i}$, $n_{j,i}^{(s)}$ and information about the channel matrix; transmitting feedback information indicating the channel matrix and the receive beamforming matrix to the BS of the j-th cell; and receiving a signal from the BS of the j-th cell using the determined receive beamforming matrix.

In accordance with another aspect of the present invention, a method for transmitting a signal in a multi-cellular network is provided. The method includes receiving, from users located in cells belonging to the multi-cellular network, feedback information indicating effective ICI channels reaching from other BSs to users of a j-th cell, a channel matrix determined by users in the cells, and a receive beamforming matrix; determining a transmit precoding matrix for data streams to be transmitted to each user located in a j-th cell among the cells belonging to the multi-cellular network, using the feedback information; and transmitting a signal to users in the j-th cell using the transmit precoding matrix. The effective ICI channels and the receive beamforming matrix are determined by reference to a number $t_{j,i}$ of effective ICI channels caused by each of other BSs, a number $n_{j,i}^{(s)}$ of ICI channels aligned to each effective ICI channel, and information about the channel matrix. The number $t_{j,i}$ of effective ICI channels caused by each of other BSs and the number $n_{j,i}^{(s)}$ of ICI channels aligned to each of the effective ICI channels are determined from a number B of the cells and a number $K_j$ of users in the j-th cell based on a total number $S_j$ of effective ICI channels of the j-th cell. The total number $S_j$ of effective ICI channels of the j-th cell is determined from the number B of cells and the number $K_j$ of users in the j-th cell.

In accordance with another aspect of the present invention, an apparatus for receiving a signal in a multi-cellular network is provided. The apparatus includes a parameter generator for determining a total number $S_j$ of effective ICI channels of a j-th cell to which a user belongs, from a number B of cells belonging to the multi-cellular network and a number $K_j$ of users in the j-th cell, and determining a number $t_{j,i}$ of effective ICI channels caused by each of other BSs and a number $n_{j,i}^{(s)}$ of ICI channels aligned to each effective ICI channel based on the number B of cells and the total number $S_j$ of effective ICI channels; a channel estimator for acquiring information about a channel matrix between users of the j-th cell and each BS, which is estimated based on reference signals transmitted from a BS of the j-th cell and other BSs; a receive beamforming matrix generator for determining effective ICI channels reaching from each of the other BSs to users of the j-th cell, and a receive beamforming matrix, by reference to $t_{j,i}$, $n_{j,i}^{(s)}$ and information about the channel matrix; and a feedback unit for transmitting feedback information indicating the channel matrix and the receive beamforming matrix to a BS of the j-th cell. The determined receive beamforming matrix is used to receive a signal from a BS of the j-th cell.

In accordance with another aspect of the present invention, an apparatus for transmitting a signal in a multi-cellular network. The apparatus includes a feedback collector for receiving, from users located in cells belonging to the multi-cellular network, feedback information indicating effective ICI channels reaching from other BSs to users of a j-th cell, a channel matrix determined by users in the cells, and a receive beamforming matrix; and a transmit precoding matrix generator for determining a transmit precoding matrix for data streams to be transmitted to each user located in the j-th cell among the cells belonging to the multi-cellular network, using the feedback information. The transmit precoding matrix is used to transmit a signal to users in the j-th cell. The effective ICI channels and the receive beamforming matrix are determined by reference to a number $t_{j,i}$ of effective ICI channels caused by each of other BSs, a number $n_{j,i}^{(s)}$ of ICI channels aligned to each effective ICI channel, and information about the channel matrix. The number $t_{j,i}$ of effective ICI channels caused by each of other BSs and the number $n_{j,i}^{(s)}$ of ICI channels aligned to each of the effective ICI channels are determined from a number B of cells and a number $K_j$ of users in the j-th cell based on a total number $S_j$ of effective ICI channels of the j-th cell. The total number $S_j$ of effective ICI channels of the j-th cell is determined from the number B of cells and the number $K_j$ of users in the j-th cell.

Other aspects, advantages, and salient features of the invention will become apparent to those skilled in the art from the following detailed description, which, taken in conjunction with the annexed drawings, discloses exemplary embodiments of the invention.

BRIEF DESCRIPTION OF THE DRAWINGS

The above and other aspects, features and advantages of certain exemplary embodiments of the present invention will be more apparent from the following description taken in conjunction with the accompanying drawings, in which.

Throughout the drawings, the same drawing reference numerals will be understood to refer to the same elements, features and structures.

DETAILED DESCRIPTION OF EXEMPLARY EMBODIMENTS

The following description with reference to the accompanying drawings is provided to assist in a comprehensive understanding of exemplary embodiments of the invention as defined by the claims and their equivalents. It includes various specific details to assist in that understanding but these are to be regarded as merely exemplary. Accordingly, those of skill in the art will recognize that various changes and modifications of the embodiments described herein can be made without departing from the scope and spirit of the invention. In addition, descriptions of well-known functions and constructions are omitted for clarity and conciseness.

It is to be understood that the singular forms "a," "an," and "the" include plural referents unless the context clearly dictates otherwise. Thus, for example, reference to "a component surface" includes reference to one or more of such surfaces.

As used herein, the term "substantially" refers to the complete or nearly complete extent or degree of an action, characteristic, property, state, structure, item, or result. For example, an object that is "substantially" enclosed would mean that the object is completely enclosed, nearly completely enclosed, or as close as possible to being completely enclosed. The exact allowable degree of deviation from absolute completeness may in some cases depend on the specific context. However, generally speaking the nearness of completion will be so as to have the same overall result as if absolute and total completion were obtained. The use of "substantially" is equally applicable when used in a negative connotation to refer to the complete or near complete lack of an action, characteristic, property, state, structure, item, or result.

A description will be made of a transmission/reception method and apparatus which may be applied to a situation where two or more cells exist in a multi-cellular network and two or more users exist in each cell.

A multi-cellular network system may include a plurality of Base Stations (BSs) and a plurality of users included in each BS, or include a plurality of BSs and a plurality of Relay Stations (RSs) included in each BS, or include a plurality of RSs and a plurality of users included in each RS. In a downlink, each BS or each RS serves as a transmitter and each user (or user terminal) serves as a receiver.

A receive beamforming device in a receiver generates a receive beamforming matrix that is calculated using Inter-Cell Interference (ICI) channel information, in order to maximize the Degree Of Freedom (DOF) or the multiplexing gain of the entire network. A transmit precoding device in a transmitter generates a transmit precoding matrix capable of cancelling not only Inter-User Interference (IUI) and ICI, but also Inter-Stream Interference (ISI) which may be caused when a plurality of data streams are transmitted to one user.

Figure 1:
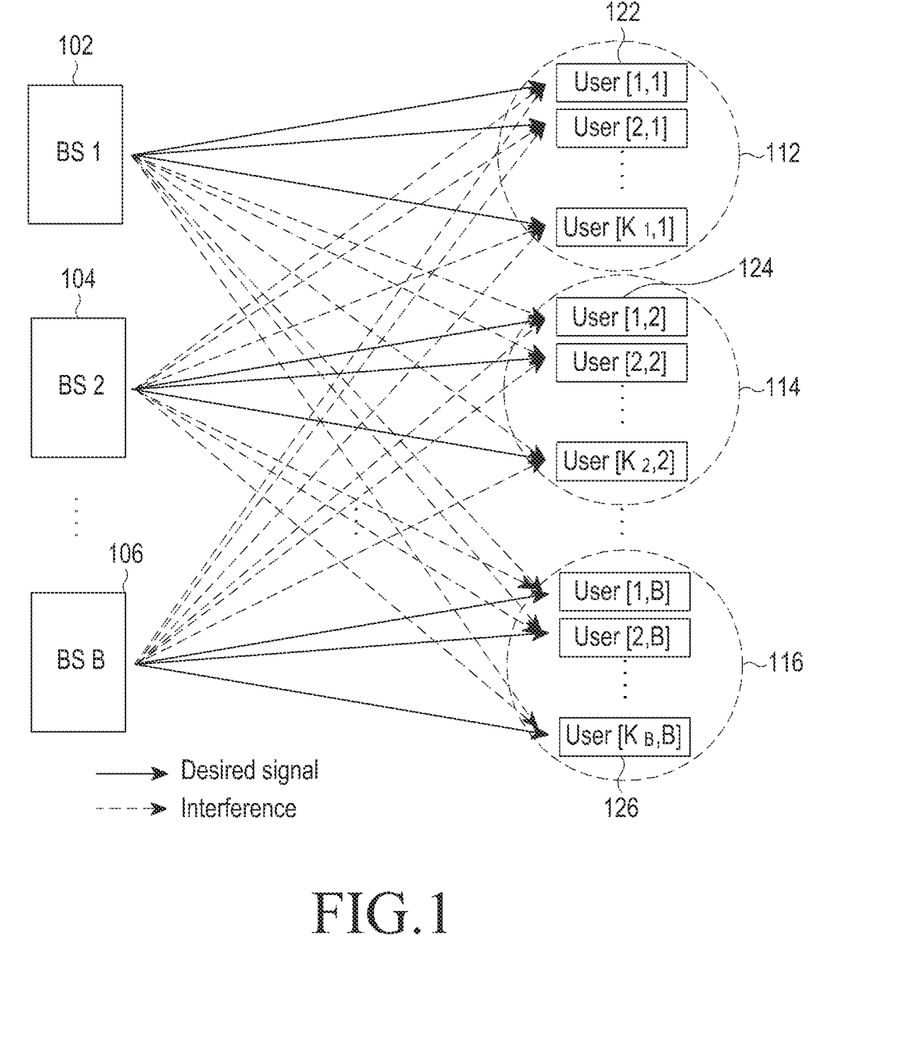
FIG. 1 illustrates a multi-cellular network system according to an exemplary embodiment of the present invention.

FIG. 1 illustrates a multi-cellular network system according to an exemplary embodiment of the present invention.

Referring to FIG. 1, the multi-cellular network system includes B cells 112, 114 and 116 which are controlled by B BSs 102, 104 and 106, respectively. Although each of the BSs 102, 104 and 106 may manage one or a plurality of cells, it will be assumed herein that one cell is dependent on one BS, for the purpose of convenience only. A j-th cell includes a j-th BS (one of the BSs 102, 104 and 106) having $M_j$ antennas, and $K_j$ users (the users 122, 124 and 126) (i.e., user [1,j] to user [$K_j$,j]) having $N_j$ antennas.

If cells use the same wireless resources in the network configured as described above, ISI, IUI and ICI may occur. Therefore, an interference alignment technique may be used to increase the performance of the system by effectively cancelling these interference signals. The interference alignment technique is technology capable of simplifying interference cancellation by mapping (or aligning) a plurality of ICI channels to a minimum possible number of effective ICI channels. Interference cancellation may be achieved within a variety of spaces, including the frequency, the time and the space (i.e., antenna), and the effective ICI channels correspond to specific subspaces.

First, a receive beamforming device generates a receive beamforming matrix for effectively aligning ICI channels which are incoming from other cells. Then, a transmit precoding device generates a transmit precoding matrix capable of cancelling ISI, IUI and ICI, by reference to the feedback from the receive beamforming device. The transmit precoding device and the receive beamforming device may also determine the number of transmit/receive antennas that they will actually use for downlink transmission/reception, among their own physical antennas, taking into account the number of effective ICI channels.

First, an algorithm of generating a receive beamforming matrix will be described.

A receive beamforming matrix serves to align ICI channels incoming from other cells to effective ICI channels. The total number of ICI channels incoming at users of a j-th cell is defined as $(B-1)K_j$. These ICI channels are aligned to $S_j$ effective ICI channels. A method of determining $S_j$ will be described in more detail later, since it is derived from equations of determining the number of antennas.

If the number of effective ICI channels reaching from an i-th BS to users of a j-th cell (where i≠j) is defined as $t_{j,i}$, $K_j$ ICI channels are aligned to $t_{j,i}$ effective ICI channels. An s-th effective ICI channel reaching from an i-th BS to users of a j-th cell is expressed as a matrix of Equation (1) below.

$$Q_{j,i}^{(S)} = [q_{j,i,1}^{(S)}, q_{j,i,2}^{(S)}, \ldots, q_{j,i,d}^{(S)}] \quad \text{Equation (1)}$$

where d denotes a number of data streams that each of the users is to receive. An m-th basis vector $q_{j,i,m}^{(s)}$ aligns a total of $n_{j,i,m}^{(s)}$ ICI channels. This means the number of ICI channels which are mapped (or aligned) to each effective ICI channel. If too many ICI channels are aligned to one effective ICI channel, the number of required antennas increases unnecessarily. Thus, $t_{j,i}$ and $n_{j,i}^{(s)}$ should be effectively determined.

Equation (2) below shows an example of an ICI channel allocation algorithm of determining $t_{j,i}$ and $n_{j,i}^{(s)}$.

For j=1:B
    If $S_j/(B-1)$ is a natural number
        $t_{j,i} = S_j/(B-1)$ for i=1,2,...,B and i≠j
    Else
        Initialize $t_{j,i}$ as $t_{j,i}$= ceil( $S_j/(B-1)$ )−1 for i=1,2,...,B and i≠j
        Initialize Z={1,2,...,B}
        For loop=1: $S_j$ −(B−1)(ceil( $S_j/(B-1)$ )−1)
            $i_{max}$=argmax$_{i \in Z, i \neq j}$ $K_i$
            Z = Z−{ $i_{max}$ }
            $t_{j,imax} = t_{j,imax} + 1$
        End
    End
    idx=1
    For i=1:B and i≠j
        Initialize $n_{j,i}^{(s)}$=1 for s=1,2,..., $t_{j,i}$
        Set $n_{j,i}^{(idx)} = n_{j,i}^{(idx)} + (K_j - t_{j,i})$
        idx=idx+($K_j - t_{j,i}$)
    End
End                                         Equation (2)

According to Equation (2), the number $t_{j,i}$ of effective ICI channels caused by each BS is determined to be the same as, or to be close to a value determined by dividing the total number $S_j$ of effective ICI channels of a j-th cell by the number (B−1) of other BSs. The number $n_{j,i}^{(s)}$ of ICI channels aligned to each effective ICI channel is determined to meet the conditions in Equation (3), in order for a receive beamforming matrix to exist at all times.

$$n_{j,i}^{(s)} < \left( \sum_{f_2=1}^{\tilde{s}-1} n_{j,i}^{(f_2)} + 2 \right) - \sum_{f_1=1}^{s-1} n_{j,i}^{(f_1)} \text{ if} \quad \text{Equation (3)}$$

$$\sum_{f_1=1}^{s-1} n_{j,i}^{(f_1)} \leq \sum_{f_2=1}^{\tilde{s}-1} n_{j,i}^{(f_2)} + 1 \text{ and}$$

$$n_{j,i}^{(s)} > 1$$

where $\tilde{i} \neq i$, $\tilde{s} = s$.

Based on the $t_{j,i}$ and $n_{j,i}^{(s)}$ determined in Equation (2), ICI channels reaching from an i-th BS to users of a j-th cell are aligned to an effective ICI channel as in Equation (4) below.

$$\text{span}(q_{j,i,m}^{(1)}) = \text{span}(H_i^{[1,j]H} u_m^{[1,j]}) = \ldots = \text{span}(H_i^{[n_{j,i}^{(1)},j]H} u_m^{[1,j]}) \quad \text{Equation (4)}$$

$$\text{span}(q_{j,i,m}^{(2)}) = \text{span}(H_i^{[n_{j,i}^{(1)}+1,j]H} u_m^{[n_{j,i}^{(1)}+1,j]}) =$$

$$\ldots = \text{span}(H_i^{[n_{j,i}^{(1)}+n_{j,i}^{(2)},j]H} u_m^{[n_{j,i}^{(1)}+n_{j,i}^{(2)},j]})$$

$$\vdots$$

$$\text{span}(q_{j,i,m}^{(t_{j,i})}) =$$

$$\text{span}(H_i^{[n_{j,i}^{(1)}+\ldots+n_{j,i}^{(t_{j,i}-1)},j]H} u_m^{[n_{j,i}^{(1)}+\ldots+n_{j,i}^{(t_{j,i}-1)},j]}) =$$

$$\ldots = \text{span}(H_i^{[K_j,j]H} u_m^{[K_j,j]})$$

where span(A)=span(B) means that a space comprised of column vectors of A is the same as a space comprised of column vectors of B, i.e., means that the results obtained by multiplying a certain constant 'a' by A are the same as the results obtained by multiplying a certain constant 'b' by B. In addition, $H^{[k,j]}$ denotes a channel matrix between an i-th BS and a k-th user of a j-th cell, and $u_m^{[k,j]}$ denotes a receive beamforming vector corresponding to an m-th data stream that a k-th user of a j-th cell is to receive.

When the transmitter transmits a plurality of streams, this receive beamforming vector is expressed as a matrix of Equation (5) below.

$$U^{[k,j]} = [u_1^{[k,j]}, \ldots, u_d^{[k,j]}] \quad \text{Equation (5)}$$

A total of $n_{j,i}^{(1)}$ ICI channels from an ICI channel $H_i^{[1,j]H} u_m^{[1,j]}$ reaching from an i-th BS to a first user of a j-th cell to an ICI channel $$H_i^{[n_{j,i}^{(1)},j]H} u_m^{[1,j]}$$

reaching from the i-th BS to an $n_{j,i}^{(1)}$-th user of the j-th cell are aligned to a first effective ICI channel $q_{j,I,m}^{(1)}$. A total of $n_{j,i}^{(2)}$ ICI channels from an ICI channel $$H_i^{[n_{j,i}^{(1)}+1,j]H} u_m^{[n_{j,i}^{(1)}+1,j]}$$

reaching from an i-th BS to an $n_{j,i}^{(1)}$+1-th user of the j-th cell to an ICI channel $$H_i^{[n_{j,i}^{(1)}+n_{j,i}^{(2)},j]H} u_m^{[n_{j,i}^{(1)}+n_{j,i}^{(2)},j]}$$

reaching from the i-th BS to an $n_{j,i}^{(1)}+n_{j,i}^{(2)}$-th user of the j-th cell are aligned to a second effective ICI channel $q_{j,i,m}^{(2)}$. In this way, $K_j$ ICI channels reaching from an i-th BS to users of a j-th cell are aligned to $t_{j,i}$ effective ICI channels $$q_{j,i,m}^{(1)}, q_{j,i,m}^{(2)}, \ldots, q_{j,i,m}^{(t_{j,i})}.$$

Equation (5) may be re-written as Equation (6) below.

$$\begin{aligned}
q_{j,i,m}^{(1)} &= H_i^{[1,j]H} u_m^{[1,j]} = \ldots = H_i^{[n_{j,i}^{(1)},j]H} u_m^{[1,j]} \\
q_{j,i,m}^{(2)} &= H_i^{[n_{j,i}^{(1)}+1,j]H} u_m^{[n_{j,i}^{(1)}+1,j]} = \ldots = H_i^{[n_{j,i}^{(1)}+n_{j,i}^{(2)},j]H} u_m^{[n_{j,i}^{(1)}+n_{j,i}^{(2)},j]} \\
&\vdots \\
q_{j,i,m}^{(t_{j,i})} &= H_i^{[n_{j,i}^{(1)}+\ldots+n_{j,i}^{(t_{j,i}-1)},j]H} u_m^{[n_{j,i}^{(1)}+\ldots+n_{j,i}^{(t_{j,i}-1)},j]} = \\
&\ldots = H_i^{[K_j,j]H} u_m^{[K_j,j]}
\end{aligned} \quad \text{Equation (6)}$$

Equation (6) may be expressed as a determinant given in Equation (7) below.

$$\begin{bmatrix}
A_{j,1} & 0 & \cdots & & \cdots & 0 & \begin{matrix} -H_1^{[1,j]H} & 0 & \cdots & \cdots & 0 \\ dt_0 & \ddots & \ddots & & \vdots \\ \vdots & & \ddots & \ddots & \vdots \\ \vdots & & & \ddots & 0 \\ 0 & \cdots & \cdots & 0 & -H_1^{[K_j,j]H} \end{matrix} \\
0 & \ddots & \ddots & & & \vdots & \vdots \\
& & & & & & \begin{matrix} -H_{j-1}^{[1,j]H} & 0 & \cdots & \cdots & 0 \\ 0 & \ddots & \ddots & & \vdots \\ \vdots & & \ddots & \ddots & \vdots \\ \vdots & & & \ddots & 0 \\ 0 & \cdots & \cdots & 0 & -H_{j-1}^{[K_j,j]H} \end{matrix} \\
\vdots & \ddots & A_{j,j-1} & \ddots & & \vdots & \\
& & & & & & \begin{matrix} -H_{j+1}^{[1,j]H} & 0 & \cdots & \cdots & 0 \\ 0 & \ddots & \ddots & & \vdots \\ \vdots & & \ddots & \ddots & \vdots \\ \vdots & & & \ddots & 0 \end{matrix} \\
& & \ddots & A_{j,j-1} & \ddots & \vdots & \\
& & & & & & \begin{matrix} \vdots & & \ddots & \ddots & \vdots \\ 0 & \cdots & \cdots & 0 & -H_{j+1}^{[K_j,j]H} \end{matrix} \\
& & & \ddots & \ddots & 0 & \\
& & & & & & \begin{matrix} -H_B^{[1,j]H} & 0 & \cdots & \cdots & 0 \\ 0 & \ddots & \ddots & & \vdots \\ \vdots & & \ddots & \ddots & \vdots \\ \vdots & & & \ddots & 0 \\ 0 & \cdots & \cdots & 0 & -H_B^{[K_j,j]H} \end{matrix} \\
0 & \cdots & & \cdots & 0 & A_{j,B} & \\
\end{bmatrix}
\begin{bmatrix}
Q_{j,1}^{(1)} \\ \vdots \\ Q_{j,1}^{(t_{j,1})} \\ \vdots \\ Q_{j,j-1}^{(1)} \\ \vdots \\ Q_{j,j-1}^{(t_{j,j-1})} \\ Q_{j,j+1}^{(1)} \\ \vdots \\ Q_{j,j+1}^{(t_{j,j+1})} \\ \vdots \\ Q_{j,B}^{(1)} \\ \vdots \\ Q_{j,B}^{(t_{j,B})} \\ U^{[1,j]} \\ \vdots \\ U^{[K_j,j]}
\end{bmatrix} = 0 \quad \text{Equation (7)}$$

$$\triangleq F_j \in \mathbb{C}\{\sum_{i=1,i\neq j}^{B} K_j M_i\} \times \{\sum_{i=1,i\neq j}^{B} t_{j,i} M_i + K_j N_j\}$$

Where $Q_{j,i}^{(1)}, \ldots, Q_{j,i}^{(t_{j,i})}$ denotes an effective ICI channel matrix comprised of basis vectors $q_{j,i,m}^{(s)}$ of an effective ICI channel for ICI channels reaching from an i-th BS to users of a j-th cell, and $U^{[k,j]}$ denotes a receive beamforming matrix comprised of receive beamforming vectors $u_m^{[k,j]}$ for d data streams of $K_j$ users. In addition, $A_{j,i}^{(s)}$ is comprised of $n_{j,i}^{(s)}$ unit matrixes $I_{Mj}$ having a size of $M_i \times M_i$ and $K_j - n_{j,i}^{(s)}$ zero matrixes $0_{M_i}$ having a size of $M_i \times M_i$, and $A_{j,i}$ is comprised of $t_{j,i}$ unit matrixes of $A_{j,i}^{(s)}$, and may be expressed as Equation (8) below where $M_i$ denotes the number of transmit antennas used for downlink transmission.

$$A_{j,i}^{(1)} = \left[ \underbrace{I_{M_i}, \ldots, I_{M_i}}_{M_i \times n_{j,i}^{(1)} M_i}, \underbrace{0_{M_i}, \ldots, 0_{M_i}}_{M_i \times (K_j - n_{j,i}^{(1)}) M_i} \right]^T \quad \text{Equation (8)}$$

$$A_{j,i}^{(2)} = \left[ \underbrace{\underbrace{0_{M_i}, \ldots, 0_{M_i}}_{M_i \times n_{j,i}^{(1)} M_i}, \underbrace{I_{M_i}, \ldots, I_{M_i}}_{M_i \times n_{j,i}^{(2)} M_i},}_{} \\ \underbrace{0_{M_i}, \ldots, 0_{M_i}}_{M_i \times (K_j - n_{j,i}^{(1)} - n_{j,i}^{(2)}) M_i} \right]^T$$

$$\vdots$$

$$A_{j,i}^{(t_{j,i})} = \left[ \underbrace{0_{M_i}, \ldots, 0_{M_i}}_{M_i \times \left(K_j - n_{j,i}^{(t_{j,i})}\right) M_i}, \underbrace{I_{M_i}, \ldots, I_{M_i}}_{M_i \times n_{j,i}^{(t_{j,i})} M_i} \right]^T$$

$$A_{j,i} = \underbrace{\left[ A_{j,i}^{(1)}, \ldots, A_{j,i}^{(t_{j,i})} \right]}_{K_j M_i \times t_{j,i} M_i}$$

The receive beamforming device may obtain an effective ICI channel $Q_{j,i}^{(t_j,i)}$ and a receive beamforming matrix $U^{[i,j]}$ by obtaining the matrix equation of Equation (7).

Second, an algorithm of generating a transmit precoding matrix will be described.

All interference channels corresponding to users may be cancelled by placing a transmit precoding matrix in a null space of a signal space comprised of IUI, ISI and effective ICI channels. A transmit precoding vector that a k-th user of an i-th cell uses when transmitting an m-th data stream, may be obtained by generating $v_m^{[k,i]}$ satisfying Equation (9) below.

$$[IUI, ICI, ISI]^H v_m^{[k,i]} = 0 \quad \text{Equation (9)}$$

In Equation (9), IUI, ICI, and ISI are delivered to a transmit precoding device of a transmitter based on feedback information from a receiver, and may be expressed as Equation (10) below.

$$IUI = [H_i^{[1,i]H} U^{[1,i]}, \ldots, H_i^{[k-1,i]H} U^{[k-1,i]},$$
$$H_i^{[k+1,i]H} U^{[k+1,i]}, \ldots, H_i^{[K_i,i]H} U^{[K_i,i]}]$$

$$ICI = [Q_{1,i}^{(1)}, \ldots, Q_{1,i}^{(t_1,i)}, \ldots, Q_{i-1,i}^{(1)}, \ldots,$$
$$Q_{i-1,i}^{(t_{i-1},i)}, Q_{i+1,i}^{(1)}, \ldots, Q_{i+1,i}^{(t_{i+1},i)}, \ldots,$$
$$Q_{B,i}^{(1)}, \ldots, Q_{B,i}^{(t_{B,i})}]$$

$$ISI = [H_i^{[k,i]H} u_1^{[k,i]}, \ldots, H_i^{[k,i]H} u_{m-1}^{[k,i]},$$
$$H_i^{[k,i]H} u_{m+1}^{[k,i]}, \ldots, H_i^{[k,i]H} u_d^{[k,i]}] \quad \text{Equation (10)}$$

IUI is a matrix having a size of $M_i \times d(K_i - 1)$, and represents a channel matrix $H_i^{[k,i]}$ and a receive beamforming matrix $U^{[k,i]}$ for $K_i$ users, where $K_i$ denotes the number of users located in an i-th BS. ICI is a matrix having a size of $$M_i \times d \sum_{j=1, j \neq i}^{B} t_{j,i},$$

and represents an effective ICI channel matrix $Q_{j,i}^{(1)}, \ldots, Q_{j,i}^{(t_{j,i})}$ for $j=1, \ldots, B$ and $j \neq i$, which corresponds to interference that an i-th BS exerts to each of other BSs. ISI is a matrix having a size of $M_i \times (d-1)$, and represents a channel matrix $H_i^{[k,i]}$ for a k-th user and a receive beamforming vector $u_{\tilde{m}}^{[k,i]}$ for $\tilde{m} \neq m$, which corresponds to the remaining (d–1) data streams except for an m-th data stream for a k-th user.

For these transmit precoding matrix and receive beamforming matrix, the number $M_i$ of transmit antennas that an i-th BS is to use and the number $N_j$ of receive antennas that a user in a j-th cell is to use, may be calculated by the following Equations (11) and (12), respectively.

$$M_i \geq \left\{ d(K_i - 1) + d \sum_{j=1, j \neq i}^{B} t_{j,i} + (d-1) \right\} + 1 \quad \text{Equation (11)}$$

$$N_j \geq \frac{\left\{ \sum_{i=1, i \neq j}^{B} K_j M_i \right\} - \left\{ \sum_{i=1, i \neq j}^{B} t_{j,i} M_i \right\} + d}{K_j} \quad \text{Equation (12)}$$

In the multi-cellular network, the number of antennas of a receiver is generally equal to or less than the number of antennas of a transmitter. Therefore, Equation (11) may be re-written as Equation (13) below.

$$M_{min} \geq N_j \geq \frac{\left\{ \sum_{i=1, i \neq j}^{B} K_j M_i \right\} - \left\{ \sum_{i=1, i \neq j}^{B} t_{j,i} M_i \right\} + d}{K_j} \geq \quad \text{Equation (13)}$$

$$\frac{\left\{ \sum_{i=1, i \neq j}^{B} K_j M_{min} \right\} - \left\{ \sum_{i=1, i \neq j}^{B} t_{j,i} M_{min} \right\} + d}{K_j}$$

$$M_{min} \geq \frac{\{(B-1)K_j - S_j\} M_{min} + d}{K_j}$$

In addition, the total number of ICI channels incoming at users of a j-th user is defined as $(B-1)K_j$, which cannot be less than $S_j$. Therefore, from Equation (13), upper and lower limits of $S_j$ may be determined as Equation (14) below.

$$(B-2)K_j + 1 \leq S_j \leq (B-1)K_j \quad \text{Equation (14)}$$

$S_j$ may be determined within a range satisfying Equation (14).

As an example, in order to minimize the amount of effective ICI channel information that needs to be fed back to each BS, $S_j$ may be selected as a lower limit value as in Equation (15).

$$S_j = (B-2)K_j + 1 \quad \text{Equation (15)}$$

As another example, a value of $S_j$ may be selected in a variety of ways within a range satisfying Equation (14), depending on the purpose of the implementation.

Figure 2:
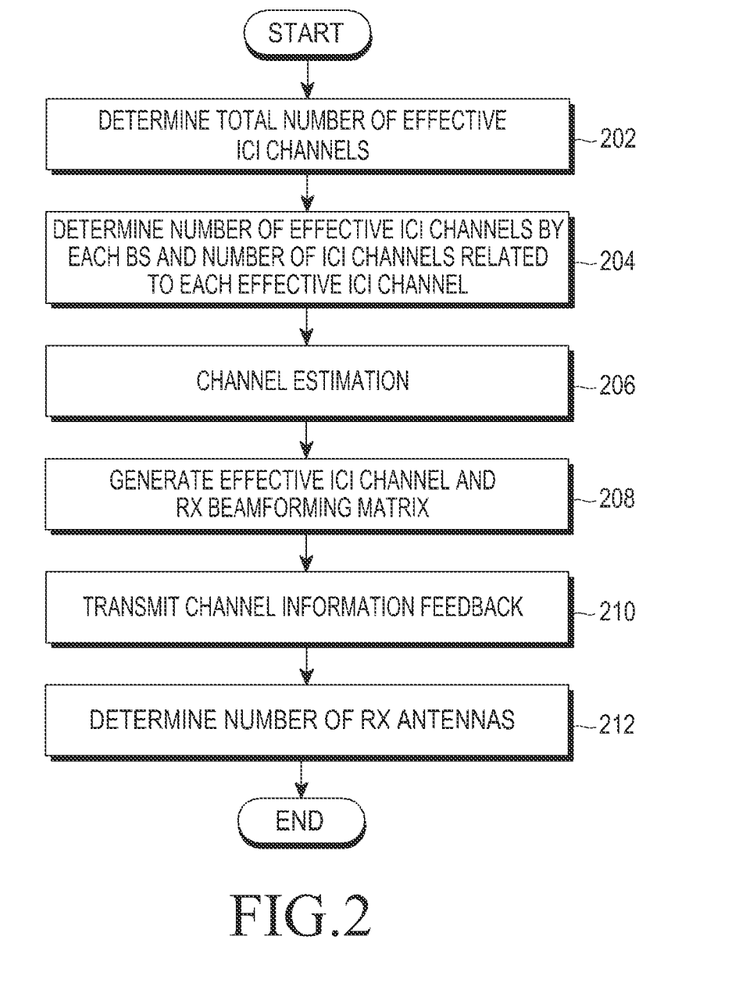
FIG. 2 is a flowchart illustrating an operation of a receiver for generating a receive beamforming matrix according to an exemplary embodiment of the present invention.

FIG. 2 is a flowchart illustrating an operation of a receiver for generating a receive beamforming matrix according to an exemplary embodiment of the present invention.

Referring to FIG. 2, in step 202, the receiver determines the total number $S_j$ of effective ICI channels of a j-th cell, from the number B of cells belonging to a multi-cellular network and the number $K_j$ of users in the current cell (i.e., j-th cell) to which the receiver belongs. The total number of effective ICI channels may be calculated by, for example, Equation (15). In step 204, the receiver determines the number $t_{j,i}$ of effective ICI channels by each of other BSs, and the number $n_{j,i}^{(s)}$ of ICI channels aligned to each of effective ICI channels. As an example, $t_{j,i}$ and $n_{j,i}^{(s)}$ may be determined to be as equivalent, or substantially equivalent, for each of other BSs, and to be as equivalent, or substantially equivalent, for each of effective ICI channels, as in the algorithm of Equation (2).

In step 206, the receiver estimates a channel (or channel matrix) between the receiver and each BS by receiving reference signals transmitted from the BS of its j-th cell and other BSs. In addition, the receiver may acquire information about the channel matrixes estimated by other receivers of the j-th cell. These channel matrixes of other receivers may be delivered through a BS of, for example, a j-th cell, or may be acquired through Device-to-Device (D2D) communication between receivers.

In step 208, based on $t_{j,i}$, $n_{j,i}^{(s)}$, and the channel matrix, the receiver determines effective ICI channels (effective ICI channel matrixes) reaching from other BSs to users of a j-th cell, and a receive beamforming matrix, in accordance with Equation (6) or Equation (7).

In step 210, the receiver transmits channel information feedback to a BS (i.e., transmitter) of a cell to which the receiver belongs, the channel information feedback indicating IUI, ICI and ISI, including a channel matrix, effective ICI channels and receive beamforming matrix. The channel information feedback may be formed in a variety of formats to reduce the amount of feedback information.

In step 212, the receiver determines the number $M_i$ of transmit antennas for each BS in accordance with, for example, Equation (11), using the number $K_i$ of users in each cell, the number $t_{j,i}$ of effective ICI channels corresponding to the interference that an i-th BS exerts on each of other BSs, and the number d of data streams transmitted to each user, and determiners the number $N_j$ of receive antennas that a receiver is to use for reception of signals, in accordance with, for example, Equation (12), using the Mi, the number $K_j$ of users in its cell, and the number $t_{j,i}$ of effective ICI channels by each of other BSs. All receivers in a j-th cell may determine $N_j$ through the same procedure.

Although not illustrated, subsequently, the receiver may receive signals containing data streams from the transmitter via $N_j$ receive antennas, using the determined receive beamforming matrix.

Figure 3:
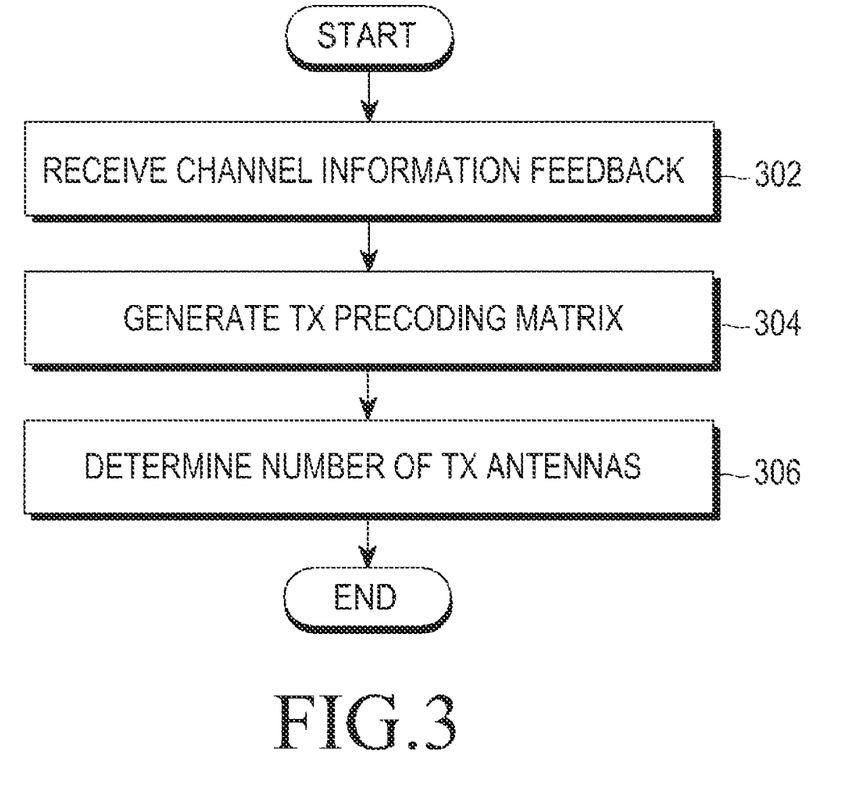
FIG. 3 is a flowchart illustrating an operation of a transmitter for generating a transmit precoding matrix according to an exemplary embodiment of the present invention.

FIG. 3 is a flowchart illustrating an operation of a transmitter for generating a transmit precoding matrix according to an exemplary embodiment of the present invention.

Referring to FIG. 3, in step 302, the transmitter receivers a channel information feedback indicating IUI, ICI and ISI from each of users in its cell. The IUI, ICI and ISI represent a channel matrix, effective ICI channels and a receive beamforming matrix, and may be determined by the users using the above-described algorithm. As another example, the channel information feedback includes a channel matrix estimated by each user, and the transmitter may determine effective ICI channels and a receive beamforming matrix for each user by reference to the channel matrix and other parameters, and notify the determined results to each user.

In step 304, the transmitter determines a transmit precoding vector for each data stream in accordance with, for example, Equation (9), using IUI, ICI and ISI included in the channel information feedback. The transmit precoding matrix is comprised of transmit precoding vectors for all data streams. In step 306, based on the channel information feedback, the transmitter determines the number $M_i$ of transmit antennas in accordance with, for example, Equation (11), using the number $K_i$ of users in its cell, the number $t_{j,i}$ of effective ICI channels corresponding to the interference that an i-th BS exerts on each of other BSs, and the number d of data streams transmitted to each user.

Although not illustrated, subsequently, the transmitter may transmit signals containing data streams to users in its cell, via M, transmit antennas, using the determined transmit precoding matrix.

Figure 4:
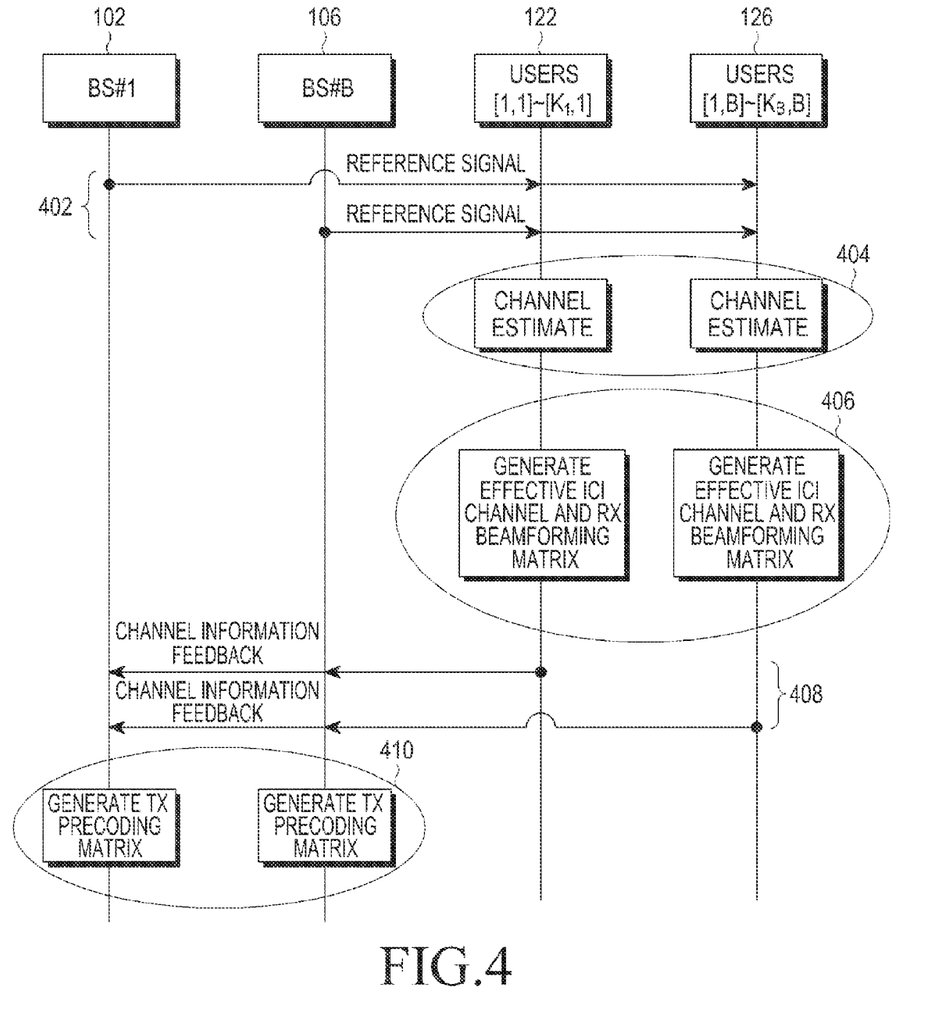
FIG. 4 illustrates a signal flow between Base Stations (BSs) and user terminals based on interference alignment according to an exemplary embodiment of the present invention.

FIG. 4 illustrates a signal flow between BSs and user terminals based on interference alignment according to an exemplary embodiment of the present invention.

Referring to FIG. 4, in step 402, B BSs 102 and 106 alternately transmit reference signals for channel estimation, to all users 122 and 126. In step 404, a receiver of each of the users estimates a channel between each BS and each user using the reference signal received from each BS. In step 406, the receiver determines $t_{j,i}$ and $n_{j,i}^{(s)}$ using the above-described ICI channel allocation algorithm, and generates a matrix of Equation (7) using the determined parameters and the estimated channels, thereby determining effective ICI channels and a receive beamforming matrix.

In step 408, each user may feed back channel information to its BS. A (1) k-th user of a j-th cell may feed back $Q_{j,i}^{(1)}, \ldots, Q_{j,i}^{(t_{j,i})}$ to another BS (i.e., an i-th BS (where i≠j)) other than its BS (BS of the j-th cell), and may feed back $H_j^{[k,j]H}U^{[k,j]}$ to the j-th BS that manages the cell to which it belongs. As another example, each user feeds back $Q_{j,i}^{(1)}, \ldots, Q_{j,i}^{(t_{j,i})}$ to a BS of the j-th cell, and the BS of the j-th cell may forward the feedback information to other BSs. In response, each BS receives feedback from users of its cell, the feedback including information about IUI and ISI, which are defined in Equation (10), and acquires information about the effective ICI channels determined by users of other cells, directly from users of other cells, or through BSs of other cells. Based on this, each BS generates a transmit precoding matrix in step 410.

Although not illustrated, each BS and each user transmit and receive downlink signals using the transmit precoding matrix and the receive beamforming matrix which are determined through the above procedure.

Figure 5:
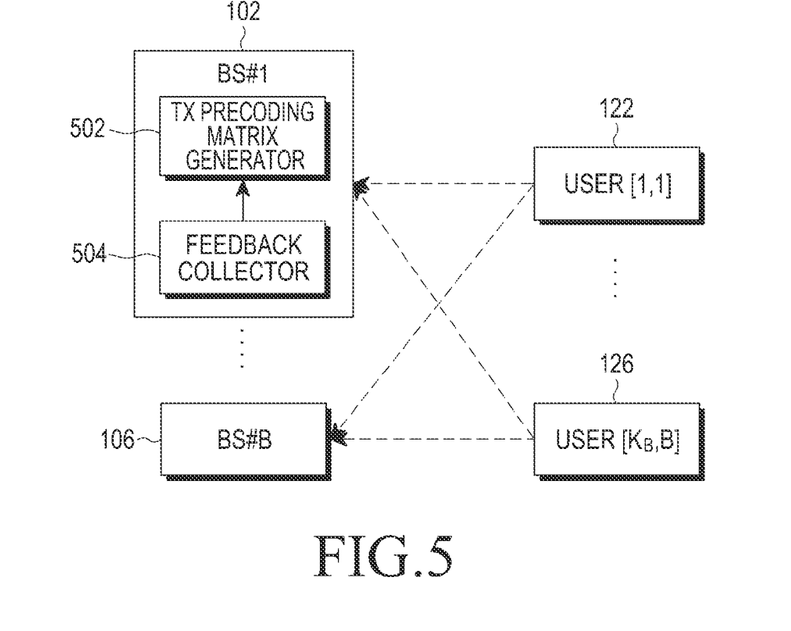
FIG. 5 is a block diagram illustrating a structure of a transmitter for generating a transmit precoding matrix according to an exemplary embodiment of the present invention.
Figure 6:
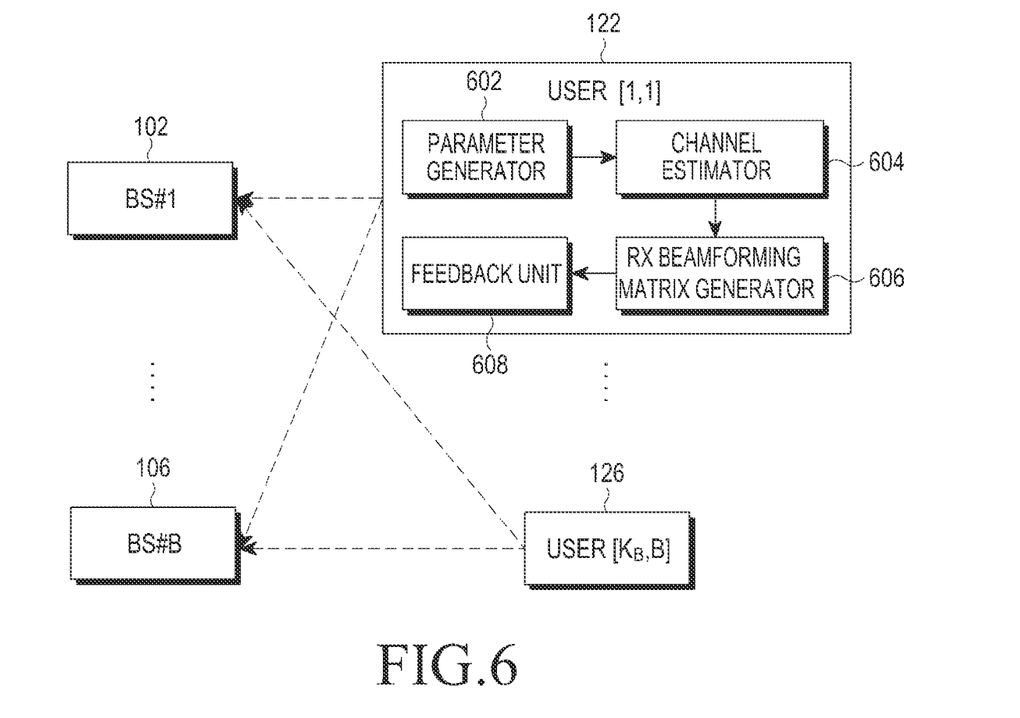
FIG. 6 is a block diagram illustrating a structure of a receiver for generating a receive beamforming matrix according to an exemplary embodiment of the present invention.

FIG. 5 illustrates a structure of a transmitter for generating a transmit precoding matrix according to an exemplary embodiment of the present invention. As illustrated, each transmitter (e.g., BS#1 102) includes a transmit precoding matrix generator 502 and a feedback collector 504. FIG. 6 illustrates a structure of a receiver for generating a receive beamforming matrix according to an exemplary embodiment of the present invention. As illustrated, each receiver (e.g., User [1,1] 122) includes a parameter generator 602, a channel estimator 604, a receive beamforming matrix generator 606, and a feedback unit 608.

First, the parameter generator 602 of the receiver determines the total number $S_j$ of effective ICI channels of a j-th cell, and determines the number $t_{j,i}$ of effective ICI channels by each of other BSs and the number $n_{j,i}^{(s)}$ of ICI channels aligned to each effective ICI channel in accordance with the above-described ICI channel allocation algorithm. The channel estimator 604 estimates information about a channel to each BS. The receive beamforming matrix generator 606 defines a determinant specified by Equation (7) using the estimated channel information, and generates value ICI channels and a receive beamforming matrix based thereon. The feedback unit 608 transmits feedback information containing the estimated channel information, the effective ICI channels, and the receive beamforming matrix, to the transmitter.

Next, the feedback collector 504 of the transmitter collects feedback information that is transmitted from a plurality of receivers located in its cell and/or cells of other BSs through the feedback unit 608, and delivers the collected feedback information to the transmit precoding matrix generator 502. The transmit precoding matrix generator 502 generates a transmit precoding matrix in accordance with Equation (9) using the feedback information.

As is apparent from the foregoing description, the technology according to the disclosed exemplary embodiments of the present invention may improve the signal transmission/reception performance by making it possible to apply the interference alignment technique to the multi-cellular downlink network in which the number of cells and the number of users in a cell are not limited. In addition, the number of antennas to be used for transmission/reception does not unnecessarily increase, preventing the waste of resources at BSs and user terminals.

While the invention has been shown and described with reference to certain exemplary embodiments thereof, it will be understood by those skilled in the art that various changes in form and details may be made therein without departing from the spirit and scope of the invention as defined by the appended claims and their equivalents.

What is claimed is:

1. A method for receiving a signal in a multi-cellular network, the method comprising:
   determining a total number $S_j$ of effective Inter-Cell Interference (ICI) channels of a j-th cell to which a user belongs, from a number B of cells belonging to the multi-cellular network and a number $K_j$ of users in the j-th cell;
   determining a number $t_{j,i}$ of effective ICI channels caused by each of other Base Stations (BSs) and a number $n_{j,i}^{(s)}$ of ICI channels aligned to each effective ICI channel, based on the number B of cells and the total number $S_j$ of effective ICI channels, wherein i denotes an index of another BS;
   acquiring information about a channel matrix between users of the j-th cell and each BS, which is estimated based on reference signals transmitted from a BS of the j-th cell and other BSs;
   determining effective ICI channels reaching from the other i BSs to users of the j-th cell and a receive beamforming matrix by reference to $t_{j,i}$, $n_{j,i}^{(s)}$ and information about the channel matrix;
   transmitting feedback information indicating the channel matrix and the receive beamforming matrix to the BS of the j-th cell; and
   receiving a signal from the BS of the j-th cell using the determined receive beamforming matrix.

2. The method of claim 1, further comprising:
   determining a number $M_t$ of transmit antennas for each of other BSs, using a number $K_i$, of users in each cell, the number $t_{j,i}$ of effective ICI channels corresponding to interference that an i-th BS exerts on each of other BSs, and a number d of data streams transmitted to each user; and
   determining a number $N_j$ of receive antennas to be used for reception of the signal, using the number $M_t$ of transmit antennas for each of other BSs, the number $K_j$ of users in the j-th cell, and the number $t_{j,i}$ of effective ICI channels caused by each of other BSs.

3. The method of claim 1, wherein the total number $S_j$ of effective ICI channels is determined within a range of the following equation;

$(B-2)K_j+1 \leq S_j \leq (B-1)K_j$.

4. The method of claim 1, wherein the number $t_{j,i}$ of effective ICI channels caused by each of other BSs is determined to be the same as, or substantially the same as, a value determined by dividing the total number $S_j$ of effective ICI channels of the j-th cell by a number (B−1) of other BSs, and wherein the number $n_{j,i}^{(s)}$ of ICI channels aligned to each of the effective ICI channels is determined to be equivalent, or substantially equivalent, for each effective ICI channel.

5. The method of claim 1, wherein the number $t_{j,i}$ of effective ICI channels caused by each of other BSs and the number $n_{j,i}^{(s)}$ of ICI channels aligned to each of the effective ICI channels are calculated by the following algorithm;

```
For j=1:B
    If S_j/(B−1) is a natural number
        t_{j,i} = S_j/(B−1) for i=1,2,...,B and i≠j
    Else
        Initialize t_{j,i} as t_{j,i} = ceil(S_j/(B−1))−1 for i=1,2,...,B and i≠j
        Initialize Z={1,2,...,B}
        For loop=1: S_j−(B−1)(ceil(S_j/(B−1))−1)
            i_max=argmax_{i∈Z, i≠j} K_i
            Z = Z−{ i_max }
            t_{j,imax} = t_{j,imax} +1
        End
    End
    idx=1
    For i=1:B and i≠j
        Initialize n_{j,i}^{(s)}=1 for s=1,2,..., t_{j,i}
        Set n_{j,i}^{(idx)}=n_{j,i}^{(idx)}+(K_j− t_{j,i})
        idx=idx+(K_j− t_{j,i})
    End
End.
```

6. The method of claim 1, wherein the receive beamforming matrix is comprised of receive beamforming vectors calculated from the following equation;

$$q_{j,i,m}^{(1)} = H_i^{[1,j]H} u_m^{[1,j]} = \ldots = H_i^{[n_{j,i}^{(1)},j]H} u_m^{[1,j]}$$

$$q_{j,i,m}^{(2)} = H_i^{[n_{j,i}^{(1)}+1,j]H} u_m^{[n_{j,i}^{(1)}+1,j]} = \ldots = H_i^{[n_{j,i}^{(1)}+n_{j,i}^{(2)},j]H} u_m^{[n_{j,i}^{(1)}+n_{j,i}^{(2)},j]}$$

$$\vdots$$

$$q_{j,i,m}^{(t_{j,i})} = H_i^{\left[n_{j,i}^{(1)}+\ldots+n_{j,i}^{(t_{j,i}-1)},j\right]H} u_m^{\left[n_{j,i}^{(1)}+\ldots+n_{j,i}^{(t_{j,i}-1)},j\right]} = \ldots = H_i^{[K_j,j]H} u_m^{[K_j,j]}$$

where $q_{j,i,m}^{(s)}$ denotes an m-th basis vector constituting an s-th effective ICI channel reaching from an i-th BS to users of a j-th cell, $H_i^{[k,j]}$ denotes a channel matrix between an i-th BS and a k-th user of a j-th cell, and $u_m^{[k,j]}$ denotes a receive beamforming vector corresponding to an m-th data stream that a k-th user of a j-th cell is to receive.

7. The method of claim 1, wherein the feedback information includes $H_j^{[k,j]H}U^{[k,j]}$, where $H_i^{[k,j]}$ denotes a channel matrix between an i-th BS and a k-th user of a j-th cell, and $U^{[k,j]}$ denotes a receive beamforming matrix comprised of receive beamforming vectors $u_m^{[k,j]}$ corresponding to d data streams that a k-th user of a j-th cell is to receive.

8. The method of claim 1, further comprising transmitting additional feedback information indicating the effective ICI channels to the other BSs,
   wherein the additional feedback information includes an effective ICI channel matrix $Q_{j,i}^{(1)}, \ldots, Q_{j,i}^{(t_{j,i})}$ comprised of basis vectors $q_{j,i,m}^{(s)}$ of effective ICI channels for B BSs.

9. A method for transmitting a signal in a multi-cellular network, the method comprising:
   receiving, from users located in cells belonging to the multi-cellular network, feedback information indicating effective Inter-Cell Interference (ICI) channels reaching from other Base Stations (BSs) to users of a j-th cell, a channel matrix determined by users in the cells, and a receive beamforming matrix;

determining a transmit precoding matrix for data streams to be transmitted to each user located in a j-th cell among the cells belonging to the multi-cellular network, using the feedback information; and transmitting a signal to users in the j-th cell using the transmit precoding matrix, wherein the effective ICI channels and the receive beamforming matrix are determined by reference to a number $t_{j,i}$ of effective ICI channels caused by each of other BSs, a number $n_{j,i}^{(s)}$ of ICI channels aligned to each effective ICI channel, and information about the channel matrix, wherein i denotes an index of another BS.

wherein the number $t_{j,i}$ of effective ICI channels caused by each of other BSs and the number $n_{j,i}^{(s)}$ of ICI channels aligned to each of the effective ICI channels are determined from a number B of the cells and a number $K_j$ of users in the j-th cell based on a total number $S_j$ of effective ICI channels of the j-th cell, and wherein the total number $S_j$ of effective ICI channels of the j-th cell is determined from the number B of cells and the number $K_j$ of users in the j-th cell.

10. The method of claim 9, further comprising determining a number $M_i$, of antennas that an i-th BS is to use for transmission of the signal, using the number $K_i$ of users in an i-th cell, the number $t_{j,i}$ of effective ICI channels corresponding to interference that an i-th BS exerts on each of other BSs, and a number d of data streams transmitted to each user.

11. The method of claim 9, wherein the total number $S_j$ of effective ICI channels is determined within a range of the following equation;

$$(B-2)K_j + 1 \leq S_j \leq (B-1)K_j.$$

12. The method of claim 9, wherein the number $t_{j,i}$ of effective ICI channels caused by each of other BSs is determined to be the same as, or substantially the same as, a value determined by dividing the total number $S_j$ of effective ICI channels of a j-th cell by a number (B−1) of other BSs; and wherein the number $n_{j,i}^{(s)}$ of ICI channels aligned to each of the effective ICI channels is determined to be equivalent, or substantially equivalent, for each effective ICI channel.

13. The method of claim 9, wherein the number $t_{j,i}$ of effective ICI channels caused by each of other BSs and the number $n_{j,i}^{(s)}$ of ICI channels aligned to each of the effective ICI channels are calculated by the following algorithm;

```
For j=1:B
    If S_j /(B-1) is a natural number
        t_{j,i} = S_j /(B-1) for i=1,2,...,B and i≠j
    Else
        Initialize t_{j,i} as t_{j,i} = ceil(S_j /(B-1) )-1 for i=1,2,...,B and i≠j
        Initialize Z={1,2,...,B}
        For loop=1: S_j -(B-1)(ceil(S_j /(B-1) )-1)
            i_max=argmax_{i∈Z, i≠j} K_i
            Z = Z-{ i_max }
            t_{j,imax} = t_{j,imax} +1
        End
    End
    idx=1
    For i=1:B and i≠j
        Initialize n_{j,i}^{(s)}=1 for s=1,2,...,t_{j,i}
        Set n_{j,i}^{(idx)} = n_{j,i}^{(idx)} + (K_j - t_{j,i})
        idx=idx+(K_j - t_{j,i})
    End
End.
```

14. The method of claim 9, wherein the receive beamforming matrix is comprised of receive beamforming vectors calculated from the following equation;

$$q_{j,i,m}^{(1)} = H_i^{[1,j]H} u_m^{[1,j]} = \ldots = H_i^{[n_{j,i}^{(1)},j]H} u_m^{[1,j]}$$

$$q_{j,i,m}^{(2)} = H_i^{[n_{j,i}^{(1)}+1,j]H} u_m^{[n_{j,i}^{(1)}+1,j]} = \ldots = H_i^{[n_{j,i}^{(1)}+n_{j,i}^{(2)},j]H} u_m^{[n_{j,i}^{(1)}+n_{j,i}^{(2)},j]}$$

$$\vdots$$

$$q_{j,i,m}^{(t_{j,i})} = H_i^{[n_{j,i}^{(1)}+\ldots+n_{j,i}^{(t_{j,i}-1)},j]H} u_m^{[n_{j,i}^{(1)}+\ldots+n_{j,i}^{(t_{j,i}-1)},j]} = \ldots = H_i^{[K_j,j]H} u_m^{[K_j,j]}$$

where $q_{j,i,m}^{(s)}$ denotes an m-th basis rector constituting an s-th effective ICI channel reaching from an i-th BS to users in a j-th cell, $H^{[k,j]}$ denotes a channel matrix between an i-th BS and a k-th user of a j-th cell, and $u_m^{[k,j]}$ denotes a receive beamforming vector corresponding to an m-th data stream that a k-th user of a j-th cell is to receive.

15. The method of claim 9, wherein the transmit precoding matrix is comprised of transmit precoding vectors determined by the following equation;

$$[IUI, ICI, ISI]^H v_m^{[k,i]} = 0$$

$$IUI = [H_i^{[1,i]H} U^{[1,i]}, \ldots, H_i^{[k-1,i]H} U^{[k-1,i]},$$
$$H_i^{[k+1,i]H} U^{[k+1,i]}, \ldots, H_i^{[K,i]H} U^{[K,i]}]$$

$$ICI = [Q_{1,i}^{(1)}, \ldots, Q_{1,i}^{(t_{1,i})}, \ldots, Q_{i-1,i}^{(1)}, \ldots, Q_{i-1,i}^{(t_{i-1,i})},$$
$$Q_{i+1,i}^{(1)}, \ldots, Q_{i+1,i}^{(t_{i+1,i})}, \ldots, Q_{B,i}^{(1)}, \ldots,$$
$$Q_{B,i}^{(t_{B,i})}]$$

$$ISI = [H_i^{[k,i]H} u_1^{[k,i]}, \ldots, H_i^{[k,i]H} u_{m-1}^{[k,i]},$$
$$H_i^{[k,i]H} u_{m+1}^{[k,i]}, \ldots, H_i^{[k,i]H} u_d^{[k,i]}]$$

where $v_m^{[k,i]}$ denotes a transmit precoding vector that a k-th user of an i-th cell uses when transmitting an m-th data stream, $H_i^{[k,j]}$ denotes a channel matrix between an i-th BS and a k-th user of a j-th cell, $u_m^{[k,j]}$ denotes a receive beamforming vector corresponding to an m-th data stream that a k-th user of a j-th cell is to receive, $U^{[k,j]}$ denotes a receive beamforming matrix comprised of receive beamforming vectors for d data streams, and $Q_{j,i}^{(1)}, \ldots, Q_{j,i}^{(t_{j,i})}$ denotes an effective ICI channel matrix for each BS.

16. The method of claim 9, wherein the feedback information includes $H_j^{[k,j]H} U^{[k,j]}$, where $H^{[k,j]}$ denotes a channel matrix between an i-th BS and a k-user of a j-th cell, and $U^{[k,j]}$ denotes a receive beamforming matrix comprised of receive beamforming vectors $u_m^{[k,j]}$ corresponding to d data streams that a k-th user of a j-th cell is to receive.

17. The method of claim 16, wherein the feedback information further includes an effective ICI channel matrix $Q_{j,i}^{(1)}, \ldots, Q_{j,i}^{(t_{j,i})}$ comprised of basis vectors $q_{j,i,m}^{(s)}$ of effective ICI channels for B BSs.

18. An apparatus for receiving a signal in a multi-cellular network, the apparatus comprising:

a parameter generator for determining a total number $S_j$ of effective Inter-Cell Interference (ICI) channels of a j-th cell to which a user belongs, from a number B of cells belonging to the multi-cellular network and a number $K_j$ of users in the j-th cell, and determining a number $t_{j,i}$ of effective ICI channels caused by each of other Base Stations (BSs) and a number $n_{j,i}^{(s)}$ of ICI channels aligned to each effective ICI channel based on the number B of cells and the total number $S_j$ of effective ICI channels; wherein i denotes an index of another BS;

a channel estimator for acquiring information about a channel matrix between users of the j-th cell and each BS, which is estimated based on reference signals transmitted from a BS of the j-th cell and other BSs;
a receive beamforming matrix generator for determining effective ICI channels reaching from each of the other BSs to users of the j-th cell, and a receive beamforming matrix, by reference to $t_{j,i}$, $n_{j,i}^{(s)}$ and information about the channel matrix; and
a feedback unit for transmitting feedback information indicating the channel matrix and the receive beamforming matrix to a BS of the j-th cell,
wherein the determined receive beamforming matrix is used to receive a signal from a BS of the j-th cell.

19. An apparatus for transmitting a signal in a multi-cellular network, the apparatus comprising:
a feedback collector for receiving, from users located in cells belonging to the multi-cellular network, feedback information indicating effective ICI channels reaching from other BSs to users of a j-th cell, a channel matrix determined by users in the cells, and a receive beamforming matrix; and
a transmit precoding matrix generator for determining a transmit precoding matrix for data streams to be transmitted to each user located in the j-th cell among the cells belonging to the multi-cellular network, using the feedback information,
wherein the transmit precoding matrix is used to transmit a signal to users in the j-th cell,
wherein the effective ICI channels and the receive beamforming matrix are determined by reference to a number $t_{j,i}$ of effective ICI channels caused by each of other BSs, a number $n_{j,i}^{(s)}$ of ICI channels aligned to each effective ICI channel, and information about the channel matrix, wherein i denotes an index of another BS,
wherein the number $t_{j,i}$ of effective ICI channels caused by each of other BSs and the number $n_{j,i}^{(s)}$ of ICI channels aligned to each of the effective ICI channels are determined from a number B of cells and a number $K_j$ of users in the j-th cell based on a total number $S_j$ of effective ICI channels of the j-th cell, and
wherein the total number $S_j$ of effective ICI channels of the j-th cell is determined from the number B of cells and the number $K_j$ of users in the j-th cell.

\* \* \* \* \*